United States Patent
Spiekermann et al.

(10) Patent No.: US 7,551,653 B2
(45) Date of Patent: Jun. 23, 2009

(54) MULTIPLE WAVELENGTH LASER ARRANGEMENT

(75) Inventors: Stefan Spiekermann, Järfälla (SE); Håkan Karlsson, Stockholm (SE); Jenni Nordborg, Stockholm (SE)

(73) Assignee: Cobolt AB, Stockholm (SE)

( * ) Notice: Subject to any disclaimer, the term of this patent is extended or adjusted under 35 U.S.C. 154(b) by 0 days.

(21) Appl. No.: 10/583,444

(22) PCT Filed: Dec. 17, 2004

(86) PCT No.: PCT/SE2004/001903

§ 371 (c)(1),
(2), (4) Date: Jun. 25, 2007

(87) PCT Pub. No.: WO2005/060053

PCT Pub. Date: Jun. 30, 2005

(65) Prior Publication Data

US 2007/0242707 A1    Oct. 18, 2007

(30) Foreign Application Priority Data

Dec. 19, 2003    (SE) .................................... 0303430

(51) Int. Cl.
*H01S 3/10* (2006.01)
(52) U.S. Cl. .......................... 372/21; 372/92; 372/97; 372/22; 372/72

(58) Field of Classification Search ............... 372/97, 372/92, 21, 72, 22
See application file for complete search history.

(56) References Cited

U.S. PATENT DOCUMENTS

| | | | | |
|---|---|---|---|---|
| 4,739,507 A * | 4/1988 | Byer et al. | ...... | 372/22 |
| 5,117,126 A * | 5/1992 | Geiger | ...... | 359/330 |
| 5,278,852 A | 1/1994 | Wu et al. | | |
| 5,651,019 A | 7/1997 | Goldberg et al. | | |
| 5,838,709 A * | 11/1998 | Owa | ...... | 372/68 |
| 5,854,802 A | 12/1998 | Jin et al. | | |
| 2004/0218653 A1 * | 11/2004 | Arbore et al. | ...... | 372/70 |
| 2006/0222023 A1 * | 10/2006 | Eyres et al. | ...... | 372/10 |

FOREIGN PATENT DOCUMENTS

EP    0644636 A2    9/1994
WO    WO 02/103863 A1    12/2002

* cited by examiner

*Primary Examiner*—Minsun Harvey
*Assistant Examiner*—Delma R Forde
(74) *Attorney, Agent, or Firm*—Buchanan Ingersoll & Rooney PC

(57) ABSTRACT

A laser arrangement comprising a first and a second resonant cavity for generating a first and a second fundamental wavelength. A first and a second non-linear region are provided in the second cavity for sum-frequency mixing of the radiation generated in the first cavity and in the second cavity, and for frequency-doubling of the radiation generated in the second cavity, respectively.

16 Claims, 1 Drawing Sheet

MULTIPLE WAVELENGTH LASER ARRANGEMENT

TECHNICAL FIELD OF THE INVENTION

The present invention relates to a diode pumped laser arrangement. More particularly, the invention relates to a laser arrangement capable of emitting at least two different wavelengths.

TECHNICAL BACKGROUND AND PRIOR ART

There are many applications in which it is desired to use a single laser beam of multiple wavelengths in the visible range of the electromagnetic spectrum. As a single beam, all wavelengths are co-propagating, i.e. propagate in the same direction and along a common propagation axis. Examples of such applications are the production of full-color images (motion picture video displays, printing and repro-graphics, etc.) and various types of fluorescence-based analyses in the field of biotechnology, such as flow-cytometry and bio scanners, and fluorescence microscopy.

Argon-ion lasers (Ar-ion lasers) have traditionally been used for many of the above applications, since they can produce multiple wavelengths in the blue and green (457, 488 and 514 nm) propagating in the same direction along a common propagation axis. Further, Ar-ion lasers provide good beam quality and high stability.

However, Ar-ion lasers are of large size, have a limited lifetime (typically <5000 hrs.), have a high power consumption (typically >1 kW of electrical power for <100 mW optical output power), and require frequent maintenance.

Recently, it has been proposed to use solid-state lasers as an alternative to Ar-ion lasers in an attempt to overcome the above-mentioned drawbacks. Among the solid-state lasers mentioned in this context are optically or electrically pumped semiconductor lasers (e.g. VCSELs or standard single-mode edge emitters) combined with elements for frequency conversion, and up-conversion fiber lasers, which are all capable of producing a laser beam in the blue or green region of the spectrum with characteristics similar to those of the Ar-ion laser.

Another proposed alternative to Ar-ion lasers is sum-frequency mixing of two diode-pumped Nd-doped laser crystals (see for example WO 02/103863).

Diode pumped laser crystals provide excellent beam properties and long operational life-time, as well as good power efficiency. However, a general problem of these solid-state lasers is that they normally only emit one wavelength. For applications where it is required to have more than one wavelength in a single beam, it then becomes necessary to combine multiple laser units and merge the output beams from these units into a single beam. Such combination could be made, for example, by means of rather complicated mirror set-ups or by coupling the radiation into an optical fiber.

In addition, a specific problem of sum-frequency mixing according to the above-referenced WO 02/103863, is that two separate pump diodes are required, thereby adding to the complexity and cost of the laser arrangement.

SUMMARY OF THE INVENTION

It is therefore an object of the present invention to provide a laser arrangement capable of simultaneous emission of light at more than one wavelength.

More particularly, the present invention aims at providing a laser arrangement which employs a single optical pump source for pumping, and which is capable of emitting at least two different wavelengths within the visible range of the electromagnetic spectrum.

The above object is met by a laser arrangement as set forth in the appended claims.

Hence, the present invention provides a laser arrangement capable of producing multiple wavelengths in the visible range propagating in one single laser beam. The laser arrangement according to the invention is based on solid state lasers, which gives the advantages of long operational life-time, small size, low power consumption, and ease of production at low cost.

According to the present invention, multiple wavelength output is obtained by frequency mixing of infrared radiation from at least two laser gain materials which are optically pumped by one single diode laser. The mixing of the different outputs is performed in two non-linear optical regions which are located within one of the resonant cavities around the gain materials.

Suitable optically pumpable gain materials according to the invention are semiconductors (e.g. VCSELs), polymers, and solid-state host materials doped with rare earth metals or transition metals. Preferred examples of the latter are Nd-doped $YVO_4$, YAG, YLF, $GVO_4$ and glass.

The use of only one single pump diode allows of a reduction of the overall size of the laser arrangement, as well as a reduction of the manufacturing costs.

When implementing embodiments of the invention, the gain materials of the arrangement should be selected or designed to have overlapping absorption bands for the pump radiation emitted by the pump source. Advantageously, the gain materials should have maximum absorption peaks which are all covered by the emission spectrum of the pump source.

Special care should be taken regarding the optics for the pump beam, the placement and arrangement of the gain materials, and the design of optical resonators, in order for the available pump power to be adequately matched to the efficiency of each involved gain material and its associated resonator. In particular, attention should be brought to the size and length of the pump beam focus, the dimensions and location of the gain materials, the optical gain (e.g. as manifested by the doping level) of the gain material, and to the optical interfaces. For optimum efficiency, all the gain materials should be placed at or near the focus of the pump beam.

The fundamental radiation produced by the two gain elements will be two essentially co-propagating beams (effectively a single beam), since the pumped mode volumes (gain region) in respective elements are co-linear due to the fact that both are pumped by the same pump source. Hence, the laser modes of the gain elements are overlapping.

According to a first embodiment of the present invention, a solid state laser arrangement is provided which can replace traditional Ar-ion lasers in applications requiring multiple wavelengths in the blue and green spectral regions.

It has been recognized by the inventors that the laser lines at 488 nm and 514 nm of the Ar-ion laser can, for many applications, be substituted by laser lines at 491 nm and 532 nm, respectively. The reason behind this is that the absorption bands of typical fluorescent dyes and photo paper etc. are sufficiently broad. Therefore, in the first embodiment of the present invention, simultaneous emission at 491 nm and 532 nm in a single laser beam is provided. To this end, two gain elements of $Nd:YVO_4$ are employed, which are both optically pumped by radiation at about 808 nm from a single broad-stripe, edge-emitting diode laser. The two gain elements are enclosed by a respective resonant cavity, providing laser action at 914 nm and 1064 nm. Radiation at 491 nm is obtained by sum-frequency mixing of the radiation at 1064 nm with the radiation at 914 nm. This sum-frequency mixing is performed inside the 1064 nm laser resonator. Radiation at 532 nm is simultaneously obtained by frequency doubling of the remaining 1064 nm radiation. Preferably, this frequency doubling is also performed within the 1064 nm laser resonator. Spatial overlap and co-directional propagation along a common propagation axis of the two visible beams are ensured by the fact that the laser beam at 1064 nm is involved in the generation of both these visible wavelengths.

Furthermore, it has been found by the inventors that the intensity stability of this laser arrangement can be significantly improved if the cavity length for the 914 nm laser is more than about 1 cm. However, extending the cavity to this length causes problems as to how both gain elements should be located at or close to the focus of the pump beam. For this reason, a folded cavity for the 914 nm laser is proposed.

The arrangement according to this embodiment can be extended to the simultaneous generation of radiation at 457 nm by frequency-doubling also of the 914 nm radiation, thereby giving yet another alternative to Ar-ion lasers.

Moreover, the gain materials could be located in resonators promoting even longer wavelengths, such as 1340 nm for a Nd:YVO$_4$ laser. By frequency-doubling of this wavelength, the inventive concept could be used as an RGB laser source for display systems, wherein only one single pump source is used and all three colors propagates in the same beam.

Nd:YVO$_4$ can operate both as a quasi three level gain material, producing radiation at 914 nm, and as a four level gain material, producing radiation at 1064 nm and/or at 1340 nm. The material also exhibits strong absorption at about 808 nm, this thereby being a suitable pumping wavelength. As known in the art, the configuration of the resonant laser cavity determines which wavelength is amplified inside the cavity. Hence, Nd:YVO$_4$ is a particularly preferred type of gain material.

In preferred embodiments of the invention, frequency conversion elements in the form of quasi-phasematching (QPM) crystals are employed. Examples of QPM crystals are periodically poled crystals of potassium-titanyl-phosphate (KTP), lithium-niobate (LN) and lithium-tantalate (LT). Also, crystal isomorphs of KTP could be used, where K has been fully or partially substituted for rubidium or cesium, and/or P has been fully or partially substituted for arsenic (RTP, RTA, CTA etc.). QPM-crystals for frequency conversion have a high effective non-linearity, which is advantageous in obtaining sufficient conversion efficiency for moderate intensities of the interacting beams. In addition, QPM enables walk off-free interaction between arbitrary wavelengths, and thus prevents spatial separation of the multiple frequency converted beams.

Also, since QPM does not rely on birefringence in the non-linear crystal, more than one frequency conversion process can be achieved in a single crystal by providing more than one QPM-grating in the same crystal. These QPM-gratings are then located after one another in the propagation direction and have grating periods suitable for the desired non-linear processes. The number of non-linear elements can thus be reduced to only one, thereby minimizing the number of high-quality optical interfaces in the arrangement. This, in turn, reduces the overall losses and increases the efficiency of the arrangement. Another positive effect of this is that the arrangement becomes less costly to produce, since the number of (costly) high-quality optical coatings are reduced.

BRIEF DESCRIPTION OF THE DRAWINGS

The different features and advantages of the invention will elucidated in the following detailed description of preferred embodiments. In the description, reference is made to the accompanying drawings, on which.

DETAILED DESCRIPTION OF THE INVENTION

Figure 1:
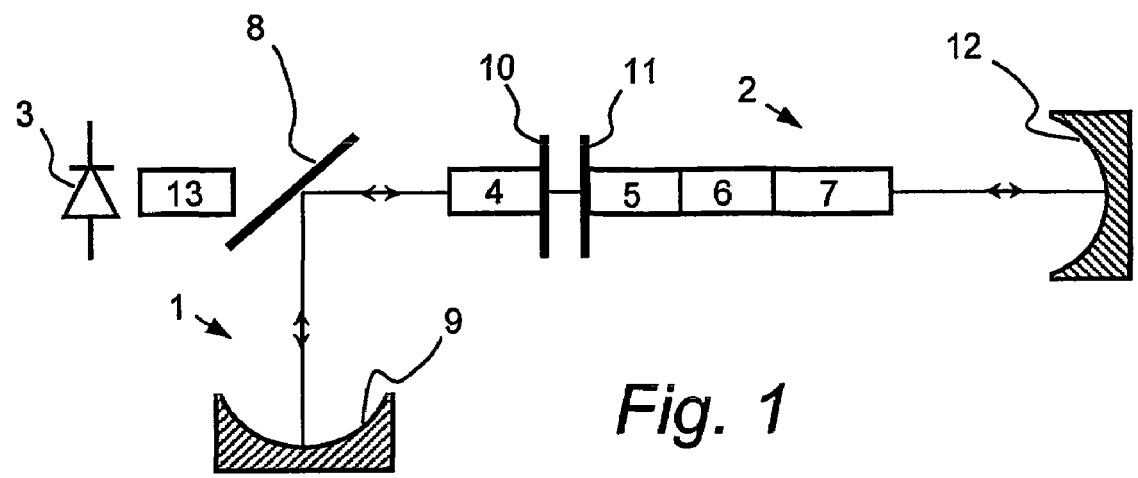
FIG. 1 schematically shows a first embodiment of the invention.

A first preferred embodiment of the invention is schematically shown in FIG. 1. The arrangement comprises a first resonant laser cavity and a second resonant laser cavity, generally indicated by references 1 and 2, respectively. The first cavity 1 is defined by a first mirror 9 and a second mirror 10, and in this cavity there is provided a first gain element 4. Similarly, the second cavity 2 is defined by a third mirror 11 and a fourth mirror 12, and in the second cavity 2 there is provided a second gain element 5. The first cavity 1 is geometrically folded by means of a beam splitter 8, in this case a dichroic mirror. A single pump source in the form of a laser diode 3 provides pump radiation for both the first and the second gain elements 4, 5. As shown, the arrangement is designed for longitudinal pumping, meaning that the pump beam is co-linear with the laser beams generated in the respective cavities. In the second cavity 2, there is provided a first non-linear optical region 6 arranged for sum-frequency mixing of the radiation generated in said first cavity and the radiation generated in said second cavity. In the second cavity 2, there is also provided a second non-linear optical region 7 arranged for frequency-doubling of the radiation generated in said second cavity.

As schematically shown in the figure, the first non-linear region, which is arranged for sum-frequency mixing of the radiation from the two cavities, is located closer to the gain elements than the second non-linear region. The reason for this is that the radiation from the first cavity should have the smallest possible beam size in order for the non-linear process to be efficient.

Both the first and the second gain element should be located close to the focus of the pump radiation. For practical reasons, beam shaping optics 13 is therefore arranged adjacent the pump source 13.

The non-linear regions 6 and 7 are in this embodiment constituted by quasi-phasematching (QPM) gratings. As mentioned above, QPM gratings have some advantageous features which add to the performance of the inventive laser arrangement. The QPM gratings are implemented in the form of periodically poled KTP crystals. The two regions could be formed in separate KTP elements, or be formed as two consecutive regions in the same physical KTP crystal. By having the two non-linear regions formed in a common crystal element, the number of optical interfaces in the arrangement is reduced, thereby reducing the complexity and cost of the arrangement.

In addition, the second mirror 10 and the third mirror 11 could advantageously be formed as a single dielectric coating deposited on gain element 4 or 5. In this way, co-propagation of the fundamental beams produced in the two cavities is further ensured.

The gain elements 4 and 5 employed in this first embodiment could be any suitable, optically pumpable gain elements. In one implementation, one or both of the gain elements 4 and 5 are comprised of optically pumpable semiconductor elements. Such semiconductor elements could for example be vertical-cavity surface-emitting lasers (VCSELs) or edge-emitters. In another implementation, one or both of the gain elements could be constituted by solid-state crystal host materials doped with an active material.

In a preferred implementation, both of the gain elements are comprised of Nd:YVO$_4$, where the first cavity 1 is designed for promoting laser emission at 914 nm, and the second cavity 2 is designed for promoting laser emission at 1064 nm. As known by the skilled person, laser action for a desired laser transition of the gain material is provided by designing the cavities to have appropriate losses for the unwanted wavelengths while yet providing sufficient feedback for the desired wavelength. Hence, frequency-converted radiation is then generated at 491 nm (sum-frequency mixing of said two wavelengths) and at 532 nm (frequency-doubling of 1064 nm).

As can be seen from the figure, both non-linear regions are located within the second cavity 2. No fundamental radiation at 1064 nm need thus be emitted from the second cavity. Instead, the fourth mirror 12 is designed to transmit the generated frequency-converted wavelengths at 491 nm and 532 nm. Since the fundamental radiation at 1064 nm generated in the second cavity 2 is involved in both non-linear processes, the two frequency-converted beams are automatically co-propagating in a single beam.

Folding of the first cavity 1 by means of the beam splitter 8 has the advantage of making this cavity longer (preferably longer than about 1 cm). By having this cavity longer, the stability of the laser action in this cavity is significantly improved.

Figure 2:
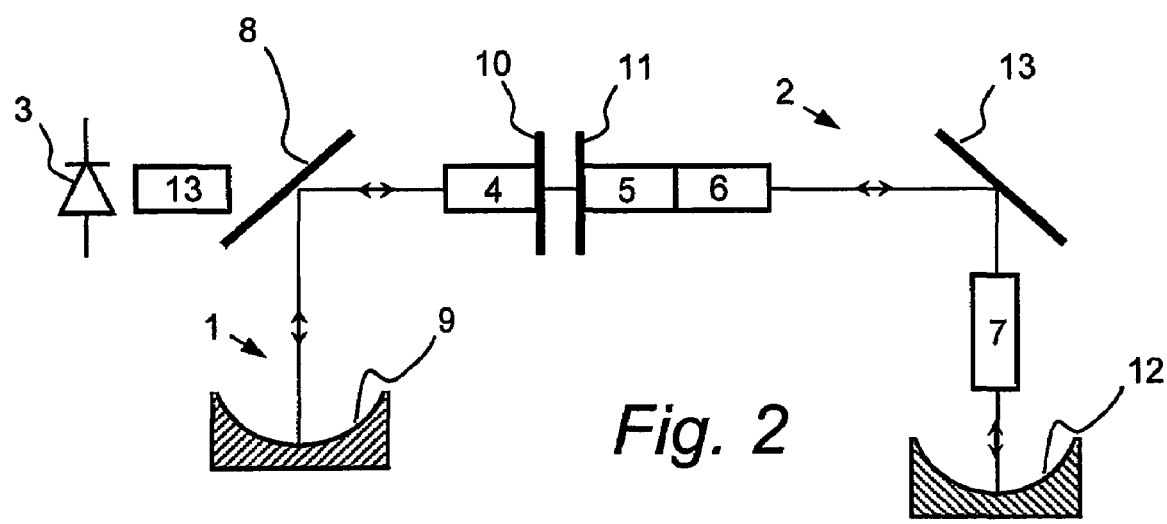
FIG. 2 schematically shows a second embodiment of the invention.

A second embodiment of the present invention is schematically shown in FIG. 2. In this embodiment, the second cavity 2 is also folded by means of a further folding mirror 13. The two non-linear regions 6 and 7 can now be located in different branches of the cavity. As for the first embodiment, sum-frequency mixing is performed in the non-linear region 6 which is closest to the gain elements 4 and 5. However, the frequency-doubling effected by the second non-linear region 7 now takes place in another branch of the cavity. This has the advantage that the generated frequency-doubled radiation can escape the cavity (through the mirror 12 and/or through the folding mirror 13), such that it does not enter into the gain materials. It is known that the presence of a frequency corresponding to twice the frequency for a laser transition in the gain elements can have a deteriorating effect on the laser action.

Figure 3:
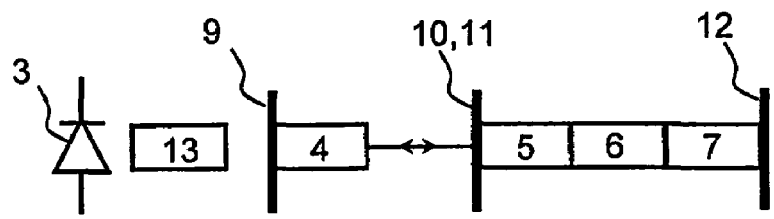
FIG. 3 schematically shows a third embodiment of the invention.

A third embodiment of the present invention is schematically shown in FIG. 3. This embodiment differs from those previously described in that no beam splitters or folding mirrors are provided. Hence, the third embodiment is a linear arrangement. The first mirror 9 is deposited on an end face of gain element 4, the second and third mirrors 10, 11 are both constituted by a single dielectric coating on an end face of gain element 5, and the fourth mirror 12 is deposited on an end face of the non-linear element 7. However, it is also possible to have these mirrors as separate elements.

In yet another embodiment (not shown on the drawings), a third non-linear region could be provided within the first cavity for frequency-doubling of the fundamental radiation from this cavity. In the case where the gain elements are constituted by Nd:YVO$_4$, it is then possible to produce radiation also at 457 nm. This gives another laser line that can substitute the wavelengths obtained from the traditional Ar-ion laser.

It should be noted that, despite the wavelengths referred to in the description of embodiments above, other wavelengths could also be produced in an arrangement according to the present invention. For example, in the case of Nd:YVO$_4$ as the gain material, one of the cavities could be designed for promoting laser action at the laser line of 1340 nm. Frequency-doubling of this radiation would then produce light at 670 nm.

Moreover, in a modification of the second embodiment, it is possible to have both the non-linear regions 6 and 7 located between the folding mirror 13 and the fourth mirror 12. As described above, these regions could be formed as two regions in a common element, without any optical interface between.

While the present invention aims primarily at providing simultaneous emission of at least two wavelengths within the visible range of the spectrum, it is to be understood that the arrangement according to the invention could also be used for generating other wavelengths.

The invention claimed is:

1. A laser arrangement, comprising:
   a first resonant laser cavity (1);
   a first optically pumpable gain element (4) located within said first cavity for generation of a first fundamental wavelength;
   a second resonant laser cavity (2);
   a second optically pumpable gain element (5) located within said second cavity for generation of a second fundamental wavelength;
   a pump source (3) arranged to optically pump both the first (4) and the second (5) gain element;
   a first non-linear optical region (6) arranged for sum-frequency mixing of the radiation generated in said first resonant cavity (1) and the radiation generated in said second resonant cavity (2);
   a second non-linear optical region (7) arranged for frequency doubling of the radiation generated in said second resonant cavity (2);
   wherein said first and second non-linear regions are both located within said second resonant cavity,
   the laser arrangement further comprising a beam splitter (8) for geometrically folding said first resonant cavity (1), said beam splitter (8) being located between said pump source (3) and said gain elements (4, 5), such that pump radiation emitted by the pump source (3) passes said beam splitter (8) before entering the gain elements.

2. An arrangement as claimed in claim 1, wherein at least one of said non-linear optical regions comprises a quasi-phasematching grating.

3. An arrangement as claimed in claim 2, wherein both of said non-linear optical regions are comprised of quasi-phase-matching gratings located in a single element.

4. An arrangement as claimed in claim 1, wherein at least one of said gain elements is an optically pumpable semiconductor element.

5. An arrangement as claimed in claim 1, wherein at lest one of said gain elements is a Nd-doped solid-state element selected from Nd:YVO$_4$, Nd:YAG, Nd:YLF, Nd.GVO$_4$, and Nd:Glass.

6. An arrangement as claimed in claim 5, wherein both of said gain elements are comprised of Nd:YVO$_4$, and wherein the first resonant cavity (1) is adapted for generation of a fundamental wavelength of 914 nm and the second resonant cavity (2) is adapted for generation of a fundamental wavelength of 1064 nm.

7. An arrangement as claimed in claim 2, wherein the non-linear optical regions are constituted by a periodically poled crystal of KTP.

8. An arrangement as claimed in claim 1, wherein a dielectric coating is provided on an end face of one of the gain elements (4, 5), said coating constituting a cavity mirror for both the first (1) and the second (2) resonant cavity.

9. An arrangement as claimed in claim 3, wherein the non-linear optical regions are constituted by a periodically poled crystal of KTP.

10. An arrangement as claimed in claim 2, wherein a dielectric coating is provided on an end face of one of the gain elements (4, 5), said coating constituting a cavity mirror for both the first (1) and the second (2) resonant cavity.

11. An arrangement as claimed in claim 3, wherein a dielectric coating is provided on an end face of one of the gain elements (4, 5), said coating constituting a cavity mirror for both the first (1) and the second (2) resonant cavity.

12. An arrangement as claimed in claim 4, wherein a dielectric coating is provided on an end face of one of the gain elements (4, 5), said coating constituting a cavity mirror for both the first (1) and the second (2) resonant cavity.

13. An arrangement as claimed in claim 5, wherein a dielectric coating is provided on an end face of one of the gain elements (4, 5), said coating constituting a cavity mirror for both the first (1) and the second (2) resonant cavity.

14. An arrangement as claimed in claim 6, wherein a dielectric coating is provided on an end face of one of the gain elements (4, 5), said coating constituting a cavity mirror for both the first (1) and the second (2) resonant cavity.

15. An arrangement as claimed in claim 7, wherein a dielectric coating is provided on an end face of one of the gain elements (4, 5), said coating constituting a cavity mirror for both the first (1) and the second (2) resonant cavity.

16. An arrangement as claimed in claim 9, wherein a dielectric coating is provided on an end face of one of the gain elements (4, 5), said coating constituting a cavity mirror for both the first (1) and the second (2) resonant cavity.

* * * * *